(12) United States Patent
Okazaki et al.

(10) Patent No.: US 7,226,551 B2
(45) Date of Patent: *Jun. 5, 2007

(54) CONDUCTIVE MEMBER FOR OA EQUIPMENT

(75) Inventors: Takahiko Okazaki, Kobe (JP); Makoto Hasegawa, Kobe (JP); Takashi Miki, Kobe (JP); Takayuki Nagase, Kobe (JP); Hiroyuki Inai, Kobe (JP)

(73) Assignee: Bando Chemical Industries, Ltd., Hyogo-ken (JP)

( * ) Notice: Subject to any disclaimer, the term of this patent is extended or adjusted under 35 U.S.C. 154(b) by 468 days.

This patent is subject to a terminal disclaimer.

(21) Appl. No.: 10/475,388

(22) PCT Filed: Apr. 22, 2002

(86) PCT No.: PCT/JP02/03978

§ 371 (c)(1),
(2), (4) Date: Dec. 16, 2003

(87) PCT Pub. No.: WO02/088250

PCT Pub. Date: Nov. 7, 2002

(65) Prior Publication Data

US 2004/0132898 A1 Jul. 8, 2004

(30) Foreign Application Priority Data

Apr. 20, 2001 (JP) ............................. 2001-123227

(51) Int. Cl.
*F16L 1/00* (2006.01)
(52) U.S. Cl. ...................... 252/511; 252/500; 252/510; 252/519.3; 428/35.7; 428/423.1; 399/111; 399/168; 524/201; 524/419; 528/44

(58) Field of Classification Search ................ 252/500, 252/511, 510, 182.2; 524/201, 419; 528/44; 428/423.1, 35.7; 399/111, 168, 286; 174/110 AR, 174/110 SR; 492/56
See application file for complete search history.

(56) References Cited

U.S. PATENT DOCUMENTS 6,140,405 A * 10/2000 Eckstein et al. ............. 524/419
6,936,184 B2 * 8/2005 Okazaki et al. ......... 252/182.22

FOREIGN PATENT DOCUMENTS

| JP | 06-035298 | * | 2/1994 |
| JP | 2002-020617 | * | 1/2002 |
| JP | 2002-146178 | | 5/2002 |
| JP | 2002-317115 | | 10/2002 |
| WO | WO 01/79354 | | 10/2001 |

* cited by examiner

*Primary Examiner*—Mark Kopec
*Assistant Examiner*—Kallambella Vijayakumar
(74) *Attorney, Agent, or Firm*—Jordan and Hamburg LLP

(57) ABSTRACT

It is an object of the present invention to provide a conductive member for use in OA equipment which shows very stable conductivity in the volume resistivity range of $10^5$ to $10^{12}$ Ω·cm, the conductivity of which is less dependent on the voltage applied and varies only slightly during continuous energization and upon changes in environmental factors such as temperature and humidity and which will not stain photoconductors due to bleeding or blooming.

The present invention provides a conductive member for OA equipment, which is obtainable by molding a composition comprising a non-ether-based polyurethane and bis(trifluoromethanesulfonyl)imidolithium.

14 Claims, No Drawings

CONDUCTIVE MEMBER FOR OA EQUIPMENT

TECHNICAL FIELD

The present invention relates to conductive members for OA equipment which are suitable for blades, rollers and belts for charging, developing, transfer, fixation, static electricity elimination, cleaning, paper feeding or transportation in electrophotographic apparatus and electrostatic recording apparatus such as copiers, facsimile equipment, printers.

BACKGROUND ART

OA equipment including electrophotographic apparatus and electrostatic recording apparatus such as copiers, facsimile equipment, printers are constituted of various parts, and blades, rollers and belts are essential parts playing such a roll as charging, developing, transfer, fixation, static electricity elimination, cleaning, paper feeding, transportation or the like in electrophotographic processes. These parts are mostly made of polyurethane materials and, in many cases, they must be provided with a conductivity of about $10^4$ to $10^{12}$ Ω·cm from the functional viewpoint.

The measures that have so far been taken for providing polyurethane members for OA equipment parts with conductivity comprise, for example, molding polyurethane materials obtained by adding and dispersing an electronically conductive substance such as carbon black, a carbon fiber, carbon flakes, a metal powder, a metal fiber, metal oxide whiskers, to and in polyurethanes, or by adding and dissolving an ionic conductive substance such as a perchlorate or an ammonium salt, to and in polyurethanes.

However, it is very difficult to provide such moldings wholly and uniformly with stable conductivity by the method comprising addition and dispersion of carbon black or a metal powder, for instance, since a slight deviation in the amount of addition of such a substance, slight changes in conditions such as material temperature, molding temperature, molding time and, further, the use of a different molding method result in changes in conductive path morphology, hence in great variations in conductivity, in particular in the volume resistivity range of $10^6$ to $10^{11}$ Ω·cm. Further, the addition of such substances to polyurethane materials sometimes leads to a marked increase in system viscosity, making molding thereof difficult and impairing the mechanical properties of moldings themselves. Furthermore, these substances are generally higher in specific gravity than polyurethanes, so that these substances sometimes settle during storage or molding, leading to failure to attain the desired level of conductivity. Moreover, with the conductive polyurethanes obtained by such methods, the electric resistance is highly dependent on the voltage applied and the electric resistance changes markedly during continuous energization, hindering the development of high-performance electrophotographic apparatus and electrostatic recording apparatus.

On the other hand, for attaining a desired level of conductivity, in particular a volume resistivity in the range of $10^5$ to $10^{10}$ Ω·cm, by the method involving addition and dissolution of an ionic conductive substance such as a perchlorate or an ammonium salt, it is necessary to add the ionic conductive substance in a relatively large amount. This produces problems; not only the cost increases but also the mechanical properties of moldings themselves are weakened and/or the ionic conductive substance bleeds out or blooms on the surface of moldings to contaminate photoconductors, papers and the like. Furthermore, since such substances are generally used in the form of masterbatches prepared by dissolving them in a highly hygroscopic substance such as polyethylene glycol, only those moldings which readily absorb moisture and show great changes in conductivity upon temperature and humidity changes can be obtained. Furthermore, the moldings obtained show a strong tendency toward great changes in resistance during continuous energization.

SUMMARY OF THE INVENTION

In view of the foregoing, it is an object of the present invention to provide a conductive member for OA equipment which shows very stable conductivity in the volume resistivity range of $10^5$ to $10^{12}$ Ω·cm, the conductivity of which is less dependent on the voltage applied and varies only slightly during continuous energization and upon changes in environmental factors such as temperature and humidity and which will not stain photoconductors due to bleeding or blooming.

The present invention is a conductive member for OA equipment, which is obtainable by molding a composition comprising a non-ether-based polyurethane and bis(trifluoromethanesulfonyl)imidolithium.

The amount of bis(trifluoromethanesulfonyl)imidolithium to be added is preferably 0.001 to 8% by weight based on the whole composition.

The conductive member for OA equipment according to the present invention preferably has a volume resistivity of $10^5$ to $10^{12}$ Ω·cm as measured by 30 second-application of a voltage of 250 V, and it is preferably the conductive member for OA equipment, wherein difference between the maximum and minimum value is at most 4 marks, when the volume resistivity values, obtained by applying a voltage of 250 V to the conductive member for OA equipment at arbitrary 15 sites selected on the surface thereof for 30 seconds, are plotted on a logarithmic graph paper each scale mark of which corresponds to $1\times10^x$ (x represents an integer). It is preferably the conductive member for OA equipment, wherein difference between the maximum and minimum value is at most 10 marks, when the volume resistivity values, obtained by applying a voltage of 10 to 1,000 V to the conductive member for OA equipment for 30 seconds, are plotted on a logarithmic graph paper each scale mark of which corresponds to $1\times10^x$ (x represents an integer) and, difference between the maximum and minimum value is at most 10 marks, when the volume resistivity values, obtained by applying a voltage of 100 V to the conductive member for OA equipment for 30 seconds, 5 minutes, 10 minutes, 15 minutes, 20 minutes, 25 minutes or 30 minutes, are plotted on a logarithmic graph paper each scale mark of which corresponds to $1\times10^x$ (x represents an integer). Furthermore, It is preferably the conductive member for OA equipment wherein difference between the maximum and minimum value is at most 4 marks, when the volume resistivity values, obtained by applying a voltage of 250 V to the conductive member for OA equipment at arbitrary 15 sites selected on the surface thereof for 30 seconds, are plotted on a logarithmic graph paper each scale mark of which corresponds to $1\times10^x$ (x represents an integer), difference between the maximum and minimum value is at most 10 marks, when the volume resistivity values, obtained by applying a voltage of 10 to 1,000 V to the conductive member for OA equipment for 30 seconds, are plotted on a logarithmic graph paper each scale mark of which corresponds to $1\times10^x$ (x represents an integer) and, difference between the maximum and minimum value is at most 10 marks, when the volume resistivity values, obtained by applying a voltage of 100 V to the conductive member for OA equipment for 30 seconds, 5 minutes, 10 minutes, 15 minutes, 20 minutes, 25 minutes or 30 minutes, are plotted on a logarithmic graph paper each scale mark of which corresponds to $1 \times 10^x$ (x represents an integer)

The conductive member for OA equipment according to the present invention which is a conductive blade, a conductive roller or a conductive belt also constitutes an aspect of the present invention.

DETAILED DISCLOSURE OF THE INVENTION

In the following, the present invention is described in detail.

The present invention is concerned with a conductive member for OA equipment, which is obtainable by molding a composition comprising a non-ether-based polyurethane and bis(trifluoromethanesulfonyl)imidolithium.

As a result of intensive investigations made by them to accomplish the above-mentioned object, the present inventors found that non-ether-based polyurethanes containing bis(trifluoromethanesulfonyl)imidolithium added thereto and dissolved therein show very stable electric resistance in the volume resistivity range of $10^5$ to $10^{12}$ Φ·CM, their conductivity does not greatly depend on the voltage and changes only slightly during continuous energization and under varying environmental conditions such as varying temperature and humidity conditions, and they do not stain photoconductors by bleeding or blooming. These findings have now led to completion of the present invention.

The composition to be used the present invention comprises a non-ether-based polyurethane and bis(trifluoromethanesulfonyl)imidolithium.

The term "non-ether-based polyurethane" as used herein means the product of the reaction between a non-ether-based polyol and a polyisocyanate.

The above non-ether-based polyol includes, for example, condensation polymer type polyester polyols such as typically poly(ethylene adipate) polyol, poly(butylene adipate) polyol, and poly(ethylene butylene adipate) polyol; lactone-derived polyester polyols such as typically poly(caprolactone) polyol and poly(β-methyl-γ-valerolactone) polyol; olefin-derived polyols such as typically poly(isoprene) polyol and poly(butadiene) polyol; poly(carbonate) polyols, castor oil-based polyols, acrylic polyols, dimer acid polyols, silicone-based polyols, fluorinated polyols and the like.

Incidentally, ether type polyols such as typically polyethylene glycol and poly(oxytetramethylene) glycol, are highly hygroscopic and increase the environment dependency of the conductivity, hence are unsuited for using conductive members for OA equipment according to the present invention.

The above-mentioned polyisocyanate is not particularly restricted but includes, for example, tolylene diisocyanate (TDI), 4,4'-diphenylmethanediisocyanate (MDI), liquid MDI, xylylene diisocyanate (XDI), naphthylene-1,5-diisocyanate (NDI), hexamethylene diisocyanate (HDI), hydrogenated TDI, hydrogenated MDI, isophoronediisocyanate (IPDI), lysinediisocyanate (LDI), isopropylidenebis(4-cyclohexyl isocyanate), norbornanediisocyanate, etc.

In reacting the above non-ether-based polyol with the above polyisocyanate, a curing agent may be added.

The curing agent is not particularly restricted but includes, for example, aliphatic, aromatic, alicyclic and heterocyclic low-molecular-weight glycols; triols such as trimethylolpropane and glycerin; polyhydric alcohols such as pentaerythritol and sorbitol; and amine compounds such as typically methylenebis-o-chloroaniline (MOCA).

The present invention is characterized by using bis(trifluoromethanesulfonyl)imidolithium represented by the formula shown below as a conductive agent.

$LiN(SO_2CF_3)_2$

This conductive agent shows a high degree of dissociation and, therefore, can provide a high level of conductivity in small amounts as compared with lithium perchlorate and quaternary ammonium salt type conductive agents in conventional use and, furthermore, can show stable conductivity even upon changes in environmental conditions, such as polyurethane drying, moisture absorption and/or temperature changes.

Bis(trifluoromethanesulfonyl)imidolithium is characterized in that it can be dissolved directly in a polyurethane-forming polyol component or in a curing agent component. Lithium perchlorate, which is in general use, cannot be dissolved in low-molecular-weight alcohols, hence it is generally used in the form of a solution in a polyether having an oligomer-level molecular weight. Therefore, even when conductive members are molded using a highly hydrophobic polyurethane for the purpose of suppressing changes in conductivity due to changes in environmental conditions, the conductivity may vary widely as the polyether absorbs moisture or dries upon changes in environmental factors. There is also the possibility that such polyether may deteriorate some or other mechanical characteristics of the moldings or may cause bleeding. Such troubles can be avoided by using bis(trifluoromethanesulfonyl)imidolithium in accordance with the present invention.

Conductive members for OA equipment are sometimes used in contact with the photoconductor, which is the core part of electrophotographic or electrostatic recording apparatus, in particular with an organic photoconductor (OPC) currently in the mainstream. Polyurethane-made conductive members with a quaternary ammonium salt type conductive agent in conventional use as incorporated therein, when in contact with an OPC, may cause turbidity on the surface of the OPC or influence on the electrostatic characteristics or otherwise stain the OPC. On the contrary, when bis(trifluoromethanesulfonyl)imidolithium is used in accordance with the present invention, OPC staining will not occur.

In the practice of the present invention, the amount of bis(trifluoromethanesulfonyl)imidolithium to be added is preferably 0.001 to 8% by weight based on the above-mentioned composition. When it is less than 0.001% by weight, it becomes difficult to provide conductivity and, further, the variation in volume resistivity value increases. On the other hand, when it exceeds 8% by weight, the mechanical properties of the polyurethane will be affected and, in addition, a cost increase results. It is further preferably 0.002 to 5% by weight.

The conductive member for OA equipment according to the present invention is obtainable by molding the above-mentioned composition.

The above-mentioned composition comprises a non-ether-based polyurethane and bis(trifluoromethanesulfonyl) imidolithium and preferably essentially consists of a non-ether-based polyurethane and bis(trifluoromethanesulfonyl) imidolithium.

In molding the above composition to obtain the conductive member for OA equipment, a catalyst may be added to the above composition for promoting the curing reaction.

The catalyst is not particularly restricted but may be any of the substances promoting the urethane formation reaction. Thus, such catalysts as amine compounds and organometallic compounds, which are generally used in urethane molding, can be used.

The method for molding of the conductive member for OA equipment is not particularly restricted but includes, for example, ordinary pressure casting molding, reduced pressure casting molding, centrifugal molding, rotational molding, extrusion molding, injection molding, reaction injection molding (RIM), and spin coating.

In the case of conventional conductive members containing carbon black, a metal powder or the like dispersed therein, the carbon black or metal powder having a higher specific gravity as compared with the polyurethane and a size in the order of microns settle with an uneven distribution during material storage or molding and, further, according to the shape of moldings, so that it is difficult to stably provide the moldings with uniform conductivity. In particular when materials are molded by the centrifugal molding method under exertion of a great centrifugal force thereon, this tendency is strong. Further, the dispersed particles may be retained in the injection machine nozzle and/or piping, possibly causing troubles. Therefore, there is no alternative but to cope with such problems by changing the conductive agent species and/or varying the amount thereof according to the shape and form of the moldings and the method of molding and/or precisely controlling the manufacturing conditions.

In the conductive member for OA equipment according to the present invention, as the conductive agent bis(trifluoromethanesulfonyl)imidolithium is uniformly dissolved in the polyurethane at a nano-order level and, therefore, it is possible to provide moldings with the desired conductivity irrespective of the method for molding without strictly controlling the manufacturing conditions.

The conductive member for OA equipment may be colored appropriately. In the present invention, the further addition of a conductive agent well known in the art, for example carbon black, is not excluded.

The conductive member for OA equipment according to the present invention shows a very stable electric resistance value in the volume resistivity range of $10^5$ to $10^{12}$ $\Omega\cdot$cm, with the conductivity being less dependent on the voltage, the changes in conductivity during continuous energization being slight and the changes in conductivity upon changes in environmental factors such as temperature and humidity being slight. Such conductive member for OA equipment according to the present invention is preferably one satisfying the specific requirement (1), (2) or (3) mentioned below.

(1) Difference between the maximum and minimum value is at most 4 marks, when the volume resistivity values, obtained by applying a voltage of 250 V to the conductive member for OA equipment at arbitrary 15 sites selected on the surface thereof for 30 seconds, are plotted on a logarithmic graph paper each scale mark of which corresponds to $1\times10^x$ (x represents an integer). It is preferably at most 2 marks.

(2) Difference between the maximum and minimum value is at most 10 marks, when the volume resistivity values, obtained by applying a voltage of 10 to 1,000 V to the conductive member for OA equipment for 30 seconds, are plotted on a logarithmic graph paper each scale mark of which corresponds to $1\times10^x$ (x represents an integer) It is preferably at most 3 marks.

(3) Difference between the maximum and minimum value is at most 10 marks, when the volume resistivity values, obtained by applying a voltage of 100 V to the conductive member for OA equipment for 30 seconds, 5 minutes, 10 minutes, 15 minutes, 20 minutes, 25 minutes or 30 minutes, are plotted on a logarithmic graph paper each scale mark of which corresponds to $1\times10^x$ (x represents an integer). It is preferably at most 5 marks.

More preferably, the conductive member for OA equipment according to the present invention satisfies all the above three requirements (1) to (3).

The conductive member for OA equipment according to the present invention may serve as any conductive member to be used in OA equipment, without any particular restriction. As such member, there may be mentioned, for example, conductive blades, conductive rollers, conductive belts and the like. Such a conductive blade, conductive roller or conductive belt also constitutes an aspect of the present invention.

BEST MODE FOR CARRYING OUT THE INVENTION

The present invention will be described in more detail by way of examples, but the present invention is not restricted only to these examples.

EXAMPLE 1

Poly(ethylene butylene adipate) polyol having an average molecular weight of 2,000 and a number of functional groups of 2 as dehydrated and defoamed by warming under reduced pressure, a prepolymer prepared by reacting poly (ethylene butylene adipate) polyol having an average molecular weight of 2,000 and a number of functional groups of 2 with MDI to attain an NCO content of 16%, and a curing agent comprising a mixture of 1,4-butanediol and trimethylolpropane in a weight ratio of 7:3 and containing bis(trifluoromethanesulfonyl)imidolithium dissolved therein in advance were weighed in respective amounts such that the ratio: number of moles of the hydroxyl group in the polyol/ number of moles of the isocyanato group in the prepolymer/ number of moles of the hydroxyl group in the curing agent amounted to 1:2.7:1.6 and, after mixing up of these with stirring, the mixture was cured in a centrifugal molding machine at 130° C. for about 1 hour. Then, the molding was taken out of the centrifugal molding machine and matured at room temperature for 12 hours to give a sheet-like sample with a thickness of 2 mm. The amount of bis(trifluoromethanesulfonyl)imidolithium to be added was 0.002% by weight based on the whole composition.

EXAMPLE 2

A sample was prepared in the same manner as in Example 1 except that the amount of bis(trifluoromethanesulfonyl) imidolithium to be added was 0.005% by weight based on the whole composition.

EXAMPLE 3

A sample was prepared in the same manner as in Example 1 except that the amount of bis(trifluoromethanesulfonyl) imidolithium to be added was 0.46% by weight based on the whole composition.

EXAMPLE 4

A sample was prepared in the same manner as in Example 1 except that the amount of bis(trifluoromethanesulfonyl) imidolithium to be added was 2.30% by weight based on the whole composition.

EXAMPLE 5

Poly(ethylene butylene adipate) polyol having an average molecular weight of 2,000 and a number of functional groups of 2 as dehydrated and defoamed by warming under reduced pressure, liquid MDI as a polyisocyanate component, and a curing agent comprising a mixture of 1,4-butanediol and trimethylolpropane in a weight ratio of 7:3 and containing bis(trifluoromethanesulfonyl)imidolithium dissolved therein in advance in respective amounts such that the ratio: number of moles of the hydroxyl group in the polyol/number of moles of the isocyanato group in the polyisocyanate/number of moles of the hydroxyl group in the curing agent amounted to 1:3.2:2.1 were added in a one-shot manner and, after mixing up with stirring, the mixture was cured in a centrifugal molding machine at 130° C. for about 1 hour. Then, the molding was taken out of the centrifugal molding machine and matured at room temperature for 12 hours to give a sheet-like sample with a thickness of 2 mm. The amount of bis(trifluoromethanesulfonyl)imidolithium to be added was 0.005% by weight based on the whole composition.

EXAMPLE 6

A sample was prepared in the same manner as in Example 5 except that the amount of bis(trifluoromethanesulfonyl) imidolithium to be added was 0.46% by weight based on the whole composition.

EXAMPLE 7

The same compound as used in Example 5 was manually cast into a mold having a 2-mm-thick spacer and maintained at 130° C. and cured at that temperature for about 1 hour. The molding was then taken out of the mold and matured at room temperature for 12 hours to give a sheet-like sample with a thickness of 2 mm.

EXAMPLE 8

The same compound as used in Example 6 was molded in the same manner as in Example 7 to give a sample.

COMPARATIVE EXAMPLE 1

Poly(ethylene butylene adipate) polyol having an average molecular weight of 2,000 and a number of functional groups of 2 as dehydrated and defoamed by warming under reduced pressure, a prepolymer prepared by reacting poly (ethylene butylene adipate) polyol having an average molecular weight of 2,000 and a number of functional groups of 2 with MDI to attain an NCO content of 16%, and a curing agent comprising a mixture of 1,4-butanediol and trimethylolpropane in a weight ratio of 7:3 were weighed in respective amounts such that the ratio: number of moles of the hydroxyl group in the polyester polyol/number of moles of the isocyanato group in the prepolymer/number of moles of the hydroxyl group in the curing agent amounted to 1:2.7:1.6, a polyethylene glycol derivative containing lithium perchlorate dissolved therein in advance was further added thereto and, after mixing up of these with stirring, the mixture was cured in a centrifugal molding machine at 130° C. for about 1 hour. Then, the molding was taken out of the centrifugal molding machine and matured at room temperature for 12 hours to give a sheet-like sample with a thickness of 2 mm. The amount of lithium perchlorate to be added was 0.002% by weight based on the whole composition.

COMPARATIVE EXAMPLE 2

Poly(ethylene butylene adipate) polyol having an average molecular weight of 2,000 and a number of functional groups of 2 as dehydrated and defoamed by warming under reduced pressure, a prepolymer prepared by reacting poly (ethylene butylene adipate) polyol having an average molecular weight of 2,000 and a number of functional groups of 2 with MDI to attain an NCO content of 16%, and a curing agent comprising a mixture of 1,4-butanediol and trimethylolpropane in a weight ratio of 7:3 and containing a quaternary ammonium salt type conductor dissolved therein in advance were weighed in respective amounts such that the ratio: number of moles of the hydroxyl group in the polyester polyol/number of moles of the isocyanato group in the prepolymer/number of moles of the hydroxyl group in the curing agent amounted to 1:2.7:1.6 and, after mixing up of these with stirring, the mixture was cured in a centrifugal molding machine at 130° C. for about 1 hour. Then, the molding was taken out of the centrifugal molding machine and matured at room temperature for 12 hours to give a sheet-like sample with a thickness of 2 mm. The amount of addition of the quaternary ammonium salt type conductor was 0.46% by weight based on the whole composition.

COMPARATIVE EXAMPLE 3

Poly(ethylene butylene adipate) polyol having an average molecular weight of 2,000 and a number of functional groups of 2 as dehydrated and defoamed by warming under reduced pressure, liquid MDI as a polyisocyanate component, and a curing agent comprising a mixture of 1,4-butanediol and trimethylolpropane in a weight ratio of 7:3 in respective amounts such that the ratio: number of moles of the hydroxyl group in the polyol/number of moles of the isocyanato group in the polyisocyanate/number of moles of the hydroxyl group in the curing agent amounted to 1:3.2:2.1 were added in a one-shot manner. Further, a polyethylene glycol derivative containing lithium perchlorate dissolved therein in advance was added thereto and, after mixing up with stirring, the mixture was cured in a centrifugal molding machine at 130° C. for about 1 hour. Then, the molding was taken out of the centrifugal molding machine and matured at room temperature for 12 hours to give a sheet-like sample with a thickness of 2 mm. The amount of addition of lithium perchlorate was 0.46% by weight based on the whole composition.

COMPARATIVE EXAMPLE 4

Poly(ethylene butylene adipate) polyol having an average molecular weight of 2,000 and a number of functional groups of 2, with conductive carbon black (Ketjen black ECP) dispersed therein in advance by kneading, as dehydrated and defoamed by warming under reduced pressure, a prepolymer prepared by reacting poly(ethylene butylene adipate) polyol having an average molecular weight of 2,000 and a number of functional groups of 2 with MDI to attain an NCO content of 16%, and a curing agent comprising a mixture of 1,4-butanediol and trimethylolpropane in a weight ratio of 7:3 were weighed in respective amounts such that the ratio: number of moles of the hydroxyl group in the polyester polyol with carbon black dispersed therein/number of moles of the isocyanato group in the prepolymer/number of moles of the hydroxyl group in the curing agent amounted to 1:2.7:1.6 and, after mixing up of these with stirring, the mixture was cured in a centrifugal molding machine at 130° C. for about 1 hour. Then, the molding was taken out of the centrifugal molding machine and matured at room temperature for 12 hours to give a sheet-like sample with a thickness of 2 mm.

COMPARATIVE EXAMPLE 5

The same compound as used in Comparative Example 4 was manually cast into a mold having a 2-mm-thick spacer and maintained at 130° C. and cured at that temperature for about 1 hour. The molding was then taken out of the mold and matured at room temperature for 12 hours to give a sheet-like sample with a thickness of 2 mm.

The samples obtained in Examples 1 to 8 and Comparative Examples 1 to 5 were subjected to the following evaluation tests. The results are shown in Table 1.

[Conductivity Evaluation]

Evaluation measurements were made using a resistance measuring apparatus (model R8340A, produced by Advantest Corp.).

(1) Volume Resistivity

Each sample was evaluated for volume resistivity by applying a voltage of 250 V for 30 seconds. Measurements were made at 15 sites all over the sample surface, and the arithmetic mean was reported as the volume resistivity value.

(2) Variation in Volume Resistivity

The volume resistivity values for the 15 sites as obtained in (1) were plotted on a logarithmic graph paper each scale mark of which corresponded to $1\times10^x$ (x represents an integer), and the variation was evaluated in terms of the difference, in number of scale marks, between the maximum and minimum value.

(3) Voltage Dependency

A voltage of 10 to 1,000 V was applied to each sample for 30 seconds and the volume resistivity values thus obtained were plotted on a logarithmic graph paper each scale mark of which corresponded to $1\times10^x$ (x represents an integer), and the dependency was evaluated in terms of the difference, in number of scale marks, between the maximum and minimum value.

(4) Changes During Continuous Energization

A voltage of 100 V was applied to each sample continuously for 30 seconds, 5 minutes, 10 minutes, 15 minutes, 20 minutes, 25 minutes or 30 minutes and resistant measurements were made at 5-minute intervals. The data obtained were plotted on a logarithmic graph paper each scale mark of which corresponded to $1\times10^x$ (x represents an integer), and the evaluation was made in terms of the difference, in number of scale marks, between the maximum and minimum value.

(5) Changes in the Environment

A voltage of 250 V was applied to each sample for 30 seconds in a low-temperature, low-humidity environment (10° C., 15% relative humidity) to a high-temperature, high-humidity environment (32.5° C., 85% relative humidity), and the volume resistivity were measured and plotted on a logarithmic graph paper each scale mark of which corresponded to $1\times10^x$ (x represents an integer) The evaluation was made in terms of the difference, in number of scale marks, between the maximum and minimum value.

(6) Variation in Surface Resistance

The surface resistances of both sides of each sample were measured and plotted on a logarithmic graph paper each scale mark of which corresponded to $1\times10^x$ (x represents an integer), and the evaluation was made in terms of the difference between them.

[Evaluation for OPC Staining]

An OPC drum, 30 mm in diameter, sensitive to an exposure wavelength of 780 nm and having minus charge polarity was used in staining evaluation. A rectangular test specimen cut out from each sample was brought into contact with the OPC and allowed to stain the OPC by maintaining the both in that state in a constant-temperature, constant-humidity vessel at 40° C. and 95% relative humidity for 2 weeks. Then, the following evaluations were made.

(7) Appearance

The sample was peeled off from the OPC, and the appearance of that portion of the OPC which had been in contact with the sample was evaluated. When there was no change at all in the portion that had been in contact with the sample in comparison with the portion that had not been in contact with the sample, the appearance was judged to be good (○) and, when there was clouding such as white turbidity, it was judged to be not good (X)

(8) Electrostatic Characteristics

Measurements were made using an electrostatic characteristics measuring apparatus (model ELYSIA VII, produced by TREK Japan K.K). The sample-contacted site and non-sample-contacted site of the OPC were subjected to a fatigue test comprising 500 charging-light exposure-discharging cycles, and comparisons were made with respect to changes in charge voltage and residual voltage with the non-contacted site. When there were no abnormalities in electrostatic characteristics, the sample was rated as good (○) and, when some or other abnormality was found, as not good (X)

TABLE 1

| | Conductivity | | | | | | OPC staining | |
|---|---|---|---|---|---|---|---|---|
| | Volume resistivity (Ω · cm) | Variation in volume resistivity | Voltage dependency | Changes during continuous energization | Changes in the environment | Variation in surface resistance | Appearance | Electrostatic characteristics |
| Example 1 | $1.1\times10^{11}$ | at most 1 mark | at most 1 mark | 1 mark | 10 marks | at most 1 mark | ○ | ○ |
| Example 2 | $1.5\times10^{10}$ | at most 1 mark | at most 1 mark | 1 mark | 8 marks | at most 1 mark | ○ | ○ |
| Example 3 | $2.9\times10^{8}$ | at most 1 mark | at most 1 mark | 3 marks | 9 marks | at most 1 mark | ○ | ○ |
| Example 4 | $3.6\times10^{6}$ | at most 1 mark | at most 1 mark | 3 marks | 9 marks | at most 1 mark | ○ | ○ |
| Example 5 | $1.6\times10^{10}$ | at most 1 mark | at most 1 mark | 1 mark | 10 marks | at most 1 mark | ○ | ○ |

TABLE 1-continued

|  | Conductivity | | | | | | OPC staining | |
|---|---|---|---|---|---|---|---|---|
|  | Volume resistivity ($\Omega \cdot cm$) | Variation in volume resistivity | Voltage dependency | Changes during continuous energization | Changes in the environment | Variation in surface resistance | Appearance | Electrostatic characteristics |
| Example 6 | $4.1 \times 10^8$ | at most 1 mark | 1 mark | 3 marks | 11 marks | at most 1 mark | ○ | ○ |
| Example 7 | $1.1 \times 10^{10}$ | at most 1 mark | at most 1 mark | 1 mark | 11 marks | at most 1 mark | ○ | ○ |
| Example 8 | $3.7 \times 10^8$ | at most 1 mark | 1 mark | 1 mark | 11 marks | at most 1 mark | ○ | ○ |
| Comparative Example 1 | $1.0 \times 10^9$ | 5 marks | 16 marks | 20 marks | 35 marks | 6 marks | x | ○ |
| Comparative Example 2 | $1.1 \times 10^{10}$ | 5 marks | 20 marks | 30 marks | 40 marks | 7 marks | x | x |
| Comparative Example 3 | $1.3 \times 10^9$ | 6 marks | 18 marks | 25 marks | 37 marks | 8 marks | x | x |
| Comparative Example 4 | $7.0 \times 10^8$ | 25 marks | 60 marks | 12 marks | 15 marks | 50 marks | ○ | ○ |
| Comparative Example 5 | $4.3 \times 10^5$ | 15 marks | 30 marks | 11 marks | 15 marks | 20 marks | ○ | ○ |

INDUSTRIAL APPLICABILITY

The present invention, which has the constitution described hereinabove, can provide conductive members for OA equipment which simultaneously have such characteristics as very stable electric resistance, slight dependency of conductivity on voltage, small changes in conductivity during continuous energization and upon changes in environmental factors such as temperature and humidity, and no tendency toward staining of photoconductors due to bleeding or blooming.

The invention claimed is:

1. A conductive member for OA equipment, which is obtainable by molding a composition comprising a non-ether-based polyol, polyisocyanate and bis(trifluoromethanesulfonyl)imidolithium.

2. The conductive member for OA equipment according to claim 1, wherein the amount of bis(trifluoromethanesulfonyl)imidolithium to be added is 0.001 to 8% by weight based on the whole composition.

3. The conductive member for OA equipment according to claim 1 or 2, which has a volume resistivity of $10^5$ to $10^{12}$ $\Omega \cdot cm$ as measured by 30 second-application of a voltage of 250 V.

4. The conductive member for OA equipment according to claim 1 or 2, wherein difference between the maximum and minimum value is set at most 4 marks, when the volume resistivity values, obtained by applying a voltage of 250 V to the conductive member for OA equipment at arbitrary 15 sites selected on the surface thereof for 30 seconds, are plotted on a logarithmic graph paper each scale mark of which corresponds to $1 \times 10^x$ (x represents an integer).

5. The conductive member for OA equipment according to claim 1 or 2, wherein difference between the maximum and minimum value is at most 10 marks, when the volume resistivity values, obtained by applying a voltage of 10 to 1,000 V to the conductive member for OA equipment for 30 seconds, are plotted on a logarithmic graph paper each scale mark of which corresponds to $1 \times 10^x$ (x represents an integer).

6. The conductive member for OA equipment according to claim 1 or 2, wherein difference between the maximum and minimum value is at most 10 marks, when the volume resistivity values, obtained by applying a voltage of 100 V to the conductive member for OA equipment for 30 seconds, 5 minutes, 10 minutes, 15 minutes, 20 minutes, 25 minutes or 30 minutes, are plotted on a logarithmic graph paper each scale mark of which corresponds to $1 \times 10^x$ (x represents an integer).

7. The conductive member for OA equipment according to claim 1 or 2, wherein difference between the maximum and minimum value is set at most 4 marks, when the volume resistivity values, obtained by applying a voltage of 250 V to the conductive member for OA equipment at arbitrary 15 sites selected on the surface thereof for 30 seconds, are plotted on a logarithmic graph paper each scale mark of which corresponds to $1 \times 10^x$ (x represents an integer), difference between the maximum and minimum value is at most 10 marks, when the volume resistivity values, obtained by applying a voltage of 10 to 1,000 V to the conductive member for OA equipment for 30 seconds, are plotted on a logarithmic graph paper each scale mark of which corresponds to $1 \times 10^x$ (x represents an integer) and, difference between the maximum and minimum value is at most 10 marks, when the volume resistivity values, obtained by applying a voltage of 100 V to the conductive member for OA equipment for 30 seconds, 5 minutes, 10 minutes, 15 minutes, 20 minutes, 25 minutes or 30 minutes, are plotted on a logarithmic graph paper each scale mark of which corresponds to $1 \times 10^x$ (x represents an integer).

8. The conductive member for OA equipment according to claim 1, which is a conductive blade.

9. The conductive member for OA equipment according to claim 1, which is a conductive roller.

10. The conductive member for OA equipment according to claim 1, which is a conductive belt.

11. The conductive member for OA equipment according to claim 1, wherein said non-ether-based polyol is a condensation polymer type polyester polyol and/or lactone-derived polyester polyol.

12. The conductive member for OA equipment according to claim 1,
wherein said non-ether-based polyol is a poly(ethylene butylene adipate)polyol.

13. The conductive member for OA equipment according to claim 1,
wherein said composition further comprises a 1,4-butanediol and trimethylolpropane.

14. The conductive member for OA equipment according to claim 1,
wherein said OA equipment is an electrophotographic apparatus or an electrostatic recording apparatus.

* * * * *